(12) United States Patent
Hori et al.

(10) Patent No.: US 12,379,681 B2
(45) Date of Patent: Aug. 5, 2025

(54) INTERMEDIATE TRANSFER MEMBER, IMAGE FORMING APPARATUS, AND PRODUCTION DEVICE FOR POLYMER MIXTURE

(71) Applicant: CANON KABUSHIKI KAISHA, Tokyo (JP)

(72) Inventors: Atsushi Hori, Chiba (JP); Akihiro Taya, Kanagawa (JP); Megumi Uchino, Tokyo (JP); Koji Sato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 18/464,070

(22) Filed: Sep. 8, 2023

(65) Prior Publication Data

US 2024/0085828 A1   Mar. 14, 2024

(30) Foreign Application Priority Data

Sep. 12, 2022 (JP) .................... 2022-144479
Oct. 6, 2022 (JP) .................... 2022-161984
Aug. 23, 2023 (JP) .................... 2023-135288

(51) Int. Cl.
*G03G 15/01* (2006.01)
*G03G 15/16* (2006.01)

(52) U.S. Cl.
CPC ... *G03G 15/162* (2013.01); *G03G 2215/1623* (2013.01)

(58) Field of Classification Search
CPC .............. G03G 15/161; G03G 15/162; G03G 2215/1623
See application file for complete search history.

(56) References Cited

U.S. PATENT DOCUMENTS

| | | | |
|---|---|---|---|
| 2010/0144972 A1 | 6/2010 | Kurachi | |
| 2016/0158799 A1* | 6/2016 | Shimoda | G03G 15/162 427/508 |
| 2016/0346985 A1 | 12/2016 | Heusser | |
| 2020/0019093 A1* | 1/2020 | Tsuruga | B29B 7/7461 |
| 2022/0082964 A1 | 3/2022 | Suzuki | |
| 2022/0397844 A1* | 12/2022 | Taya | G03G 15/162 |

FOREIGN PATENT DOCUMENTS

| | | |
|---|---|---|
| JP | S5621517 U | 2/1981 |
| JP | 2002308995 A | 10/2002 |
| JP | 2004279531 A | 10/2004 |
| JP | 2007178471 A | 7/2007 |
| JP | 2010137405 A | 6/2010 |
| JP | 2012133220 A | 7/2012 |
| JP | 2020173347 A | 10/2020 |
| JP | 2022094202 A | 6/2022 |

* cited by examiner

*Primary Examiner* — Hoang X Ngo
(74) *Attorney, Agent, or Firm* — Canon U.S.A., Inc. IP Division

(57) ABSTRACT

An intermediate transfer member including a base layer, wherein the base layer contains a thermoplastic resin and an electroconductive filler dispersed in the thermoplastic resin, and wherein the base layer has a volume resistivity of $1 \times 10^6$ to $1 \times 10^{13}$ Ω·cm, and the base layer has an electroconductive path index of 0.20 or less.

12 Claims, 9 Drawing Sheets

FIG. 7A

| pixel 1 | pixel 2 | pixel 3 |
|---|---|---|
| pixel 4 | pixel 5 | pixel 6 |
| pixel 7 | pixel 8 | pixel 9 |

FIG. 7B

| 0 | 3000 | 3000 | 3000 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG. 7C

| 0 | 3000 | 3000 | 3000 | 0 |
|---|---|---|---|---|
| 0 | 1E+26 | 6000 | 3E+26 | 0 |
| 0 | 3000 | 3E+26 | 18000 | 0 |
| 0 | 1E+26 | 12000 | 1E+27 | 0 |
| 0 | 0 | 0 | 0 | 0 |

FIG. 7D

| 500 | 300 | 400 |
|---|---|---|
| 300 | 700 | 200 |
| 400 | 300 | 500 |

FIG. 7E

| P22-1 | P11 | P22-1 |
|---|---|---|
| P11 | P22-1 | P11 |
| P22-1 | P11 | P22-1 |

FIG. 8

| pixel 1 | pixel 2 | pixel 3 |
|---------|---------|---------|
| pixel 4 | pixel 5 | pixel 6 |
| pixel 7 | pixel 8 | pixel 9 |

INTERMEDIATE TRANSFER MEMBER, IMAGE FORMING APPARATUS, AND PRODUCTION DEVICE FOR POLYMER MIXTURE

BACKGROUND

Technical Field

At least one embodiment of the present disclosure relates to an intermediate transfer member to be used in an image forming apparatus, such as a copying machine, a printer, or a facsimile, using an electrophotographic system or an electrostatic recording system. In addition, another embodiment of the present disclosure relates to an image forming apparatus. Further, another embodiment of the present disclosure relates to a production device for a polymer mixture.

Description of the Related Art

In a color electrophotographic image forming apparatus including an intermediate transfer member, first, an electrostatic latent image of each color, for example, a yellow, magenta, cyan, or black color, is formed on a photosensitive drum of each color, and each of the electrostatic latent images is developed with toner of each color. Then, the toner image on each of the photosensitive drums is sequentially transferred onto the intermediate transfer member in a primary transfer portion. Then, a color image is formed on the intermediate transfer member, and subsequently, the color image formed on the intermediate transfer member is secondarily transferred onto a recording medium in a secondary transfer portion to form a color image.

In Japanese Patent Application Laid-Open No. 2012-133220, there is disclosed a semiconductive film that may be used for an intermediate transfer member. The semiconductive film contains a thermoplastic resin and a predetermined amount of acetylene black, and has a predetermined volume resistivity. In addition, the particle number density of the acetylene black observed in a cross-section of the semiconductive film is 20 particles/$\mu m^2$, and the average distance between adjacent wall surfaces of the acetylene black is 120 nm or less. There is disclosed that, in this semiconductive film, a highly dispersed state with less aggregation and uneven distribution of the acetylene black is achieved, and the generation of a new electroconductive path caused by current concentration and dielectric breakdown can be suppressed even when a transfer bias is applied.

In the primary transfer portion, a metal roller covered with a semiconductive rubber has hitherto been used as a primary transfer roller. However, in recent years, in order to reduce cost, a metal roller not covered with a semiconductive rubber has come to be used as the primary transfer roller. When the metal roller not covered with a semiconductive rubber is used as the primary transfer roller, the resistance value of the primary transfer portion, to which the semiconductive rubber of the primary transfer roller and the intermediate transfer member have hitherto contributed, is determined only by the intermediate transfer member. Thus, in order to stabilize the value of a current flowing through the primary transfer portion, it is required that the resistance value of the intermediate transfer member not fluctuate more than ever even after long-term use.

However, when extrusion is performed through use of an apparatus involving melt kneading under the condition that the molding temperature and the kneading degree are increased in a cylinder equipped with a screw, such as a kneading extruder, an extrusion molding machine, or an injection molding machine, in order to improve the dispersion of the electroconductive filler, the resin temperature is increased owing to the heat generated by shearing. As a result, thermal deterioration (crosslinking caused by thermal decomposition or oxidation) of a resin material proceeds, and owing to the generated thermal deterioration product or an aggregate of the thermal deterioration product, the electroconductive filler, impurities, and the like, it becomes difficult to achieve excellent mechanical characteristics, optical characteristics, and electrical characteristics.

In particular, the use of the metal roller not covered with a semiconductive rubber as the primary transfer roller leads to a system in which the electric load on the intermediate transfer member is large. In such system, when a tubular film formed of a resin material and an electroconductive filler is used as the intermediate transfer member, it has been significantly difficult to stabilize electrical characteristics over long-term use.

SUMMARY

At least one embodiment of the present disclosure is directed to providing an intermediate transfer member capable of maintaining stable electrical characteristics over a long period of time. In addition, at least one embodiment of the present disclosure is directed to providing an image forming apparatus capable of stably forming a high-quality electrophotographic image. Further, at least one embodiment of the present disclosure is directed to providing a production device for a polymer mixture excellent in dispersibility of electroconductive particles.

According to at least one embodiment of the present disclosure, there is provided an intermediate transfer member including a base layer, the base layer containing a thermoplastic resin and an electroconductive filler dispersed in the thermoplastic resin, the base layer having a volume resistivity of $1 \times 10^6$ to $1 \times 10^{13}$ $\Omega \cdot cm$, and having an electroconductive path index of 0.20 or less. The electroconductive path index is determined through the following steps (1) to (6):

(1) acquiring secondary electron images from any arbitrary position of each of three regions obtained by dividing a cross-section in a thickness direction of the base layer into equally three in the thickness direction of the base layer, with a magnification of 20,000 times, each of the secondary electron images having a size of 3.6 $\mu m$ in length and 3.6 $\mu m$ in width, a resolution of 300 pixels×300 pixels, and 256 gradations from a lowest gradation of 0 to a highest gradation of 255;

(2) subjecting the pixels in each of the secondary electron images to adaptive thresholding of which a binarized threshold is defined as an average value, to thereby obtain a first binarized images each of which includes a pixel group P1 corresponding to the electroconductive filler and a pixel group P2 corresponding to the thermoplastic resin;

(3) determining a potential of each of the pixels in each of the first binarized images through use of a difference method based on Kirchhoffs laws;

(4) as to each of the first binarized images, assuming that pixels belonging to the pixel group P2 are defined as pixels P22, pixels belonging to the pixel group P1 are defined as pixels P11, and among pixels P22, a pixel or pixels which is adjacent to at least one of the pixels P11 is defined as pixels P22-1, determining a potential difference between the pixel P22-1 and the pixel(s) P11 adjacent to the pixel P22-1 based on the potentials determined in the step (3), and when the potential difference is more than 300 V, obtaining a second binarized image in which the pixel P22-1 whose potential difference between the pixel(s) P11 adjacent thereto is substituted with the pixel P11, and determining a potential of each of the pixels in the second binarized image through use of the difference method based on Kirchhoff's laws;

(5) repeating the step (4) until the pixels P22-1 each having the potential difference of more than 300 V are eliminated, to thereby determine a convergence potential of each of the pixels; and (6) determining a combined resistance value A based on the potentials determined in the step (3), determining a combined resistance value B based on the convergence potentials determined in the step (5), and determining an electroconductive path index by the following equation (1):

$$\text{Electroconductive path index} = (A-B)/A \quad (1).$$

According to at least one embodiment of the present disclosure, there is provided an image forming apparatus including: a first image bearing member; an intermediate transfer member onto which an unfixed toner image formed on the first image bearing member is primarily transferred; and a secondary transfer unit configured to secondarily transfer the toner image primarily transferred onto the intermediate transfer member onto a second image bearing member, wherein the intermediate transfer member is the above-mentioned intermediate transfer member.

According to at least one embodiment of the present disclosure, there is provided a production device for a polymer mixture containing a thermoplastic resin and an electroconductive filler, the production device including: a flow path having an inner diameter D1 in which the polymer mixture containing the thermoplastic resin that has been plasticized flows; a shear force applying portion, which is coupled to a distal end side of the flow path, and which is configured to apply a shear force to the polymer mixture; and at least two flow paths, which are coupled to a distal end side of the shear force applying portion, and in which the polymer mixture having passed through the shear force applying portion flows, wherein a ratio (D1/D2) of the inner diameter D1 to a face-to-face distance D2 of a gap portion in the shear force applying portion is from 10 to 20.

Further features of the disclosure will become apparent from the following description of exemplary embodiments with reference to the attached drawings.

BRIEF DESCRIPTION OF THE DRAWINGS

FIG. 7A is a diagram for illustrating an example of a binarized image obtained in a step S101 of the flowchart of FIG. 6. FIG. 7B is an explanatory diagram of a set state of a potential of each of pixels in the binarized image when a first potential map is acquired in a step S102 of the flowchart of FIG. 6. FIG. 7C is a diagram for illustrating an example of the first potential map obtained in the step S102 of the flowchart of FIG. 6. FIG. 7D is a diagram for illustrating an example of a determined potential map D1 obtained in a step S107 of the flowchart of FIG. 6. FIG. 7E is an explanatory diagram of a pixel P22-1 in a step S108 of the flowchart of FIG. 6.

FIG. 8 is a diagram for illustrating one example of a binarized image obtained in a step S110 of the flowchart of FIG. 6.

DESCRIPTION OF THE EMBODIMENTS

Figure 1:
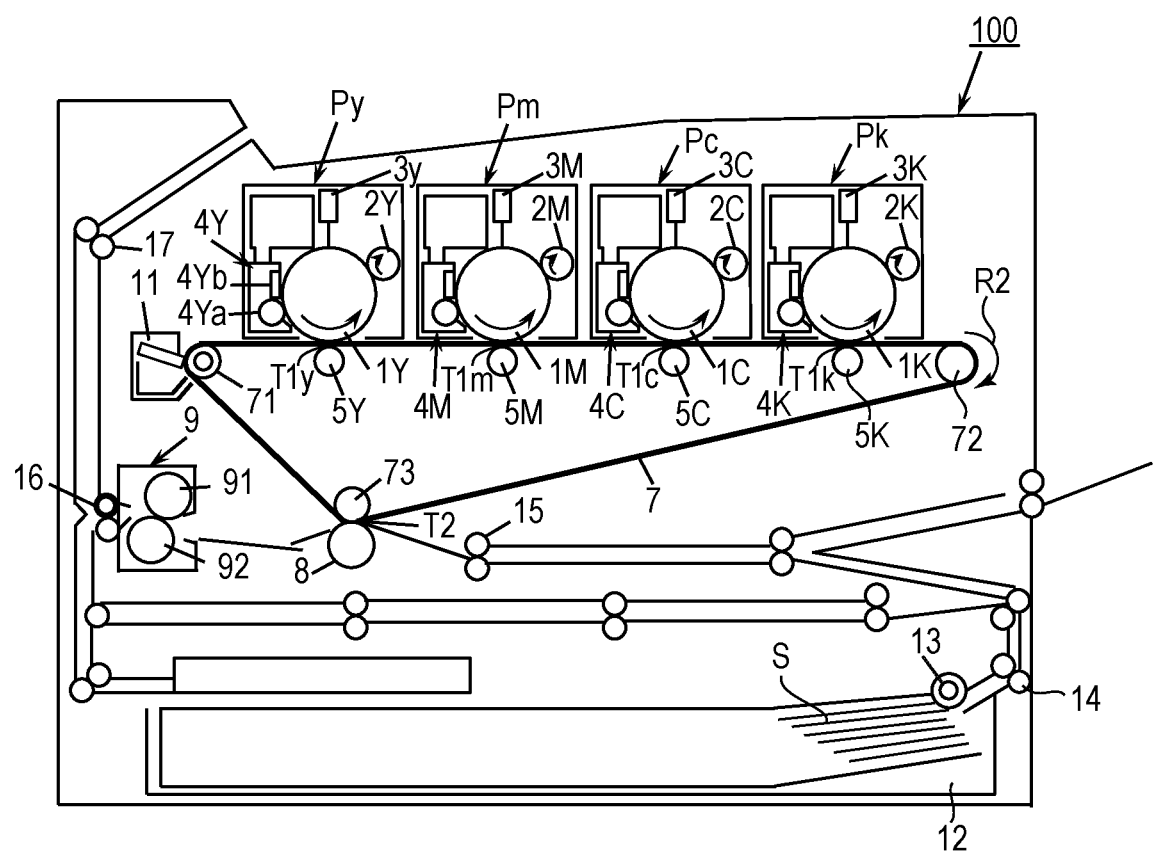
FIG. 1 is a schematic view of a cross-section of an image forming apparatus using an intermediate transfer member according to the present disclosure.

Herein, the descriptions "XX or more and YY or less" and "from XX to YY" representing numerical value ranges each mean a numerical value range including a lower limit and an upper limit that are end points unless otherwise stated. In addition, a case in which numerical value ranges are described in a stepwise manner discloses any combination of the upper limit and lower limit of each of the numerical value ranges.

Now, an intermediate transfer member and a method of producing an intermediate transfer member according to the present disclosure are described in more detail with reference to the drawings. The scope of the present disclosure is not limited to the specific configuration described below, and modifications made to such an extent that the gist of the present disclosure is not impaired are also encompassed in the present disclosure.

The inventors have found such a problem as described below when the semiconductive film according to Japanese Patent Application Laid-Open No. 2012-133220 is used as an intermediate transfer belt.

That is, in a color electrophotographic image forming apparatus, a rubber roller in which the circumference of a metal cored bar is covered with a semiconductive rubber layer is used as a primary transfer roller in a primary transfer portion. However, in order to further reduce cost, a metal roller has come to be used as the primary transfer roller. When the metal roller is used as the primary transfer roller, the resistance value of the primary transfer portion, to which the semiconductive rubber layer of the rubber roller and the intermediate transfer belt have contributed, is determined only by the intermediate transfer belt. Thus, in order to suppress the fluctuation of the value of a current flowing through the primary transfer portion over time, the intermediate transfer belt has started to be required to have further stability of conductivity over time.

In addition, when the semiconductive film according to Japanese Patent Application Laid-Open No. 2012-133220 was mounted as an intermediate transfer belt on an electrophotographic image forming apparatus using a metal roller as a primary transfer roller as described above to form a large number of color images, the volume resistivity of the intermediate transfer belt was significantly changed from an initial value in some cases. The reason why the electric resistance of the intermediate transfer belt using the semiconductive film in which acetylene black is present so that the average distance between adjacent wall surfaces thereof is 120 nm or less is decreased over time is presumed to be caused by the deterioration of a resin present between particles of carbon black (hereinafter sometimes referred to as "CB") in an electroconductive path of the CB formed in the semiconductive film. That is, it is conceived that the electric resistance of the electroconductive path includes the electric resistance of the CB portion, the electric resistance of a coupling portion (contact portion) between particles of the CB, and the electric resistance of the resin portion between the particles of the CB. When the distance between the particles of the CB is non-uniform, a portion in which an electric field is concentrated in the resin portion between the particles of the CB is locally generated when a transfer voltage is applied at the time of the formation of an image. Then, the concentrated portion of the electric field generates heat, and the resin between the particles of the CB is carbonized. As a result, the electroconductive path in which the resin between the particles of the CB is carbonized has high conductivity. Accordingly, it is conceived that the electric resistance of the semiconductive film is decreased over time. The inventors have recognized that it is difficult to suppress the local concentration of an electric field and the carbonization of the resin caused by the local concentration of the electric field unless the distance between the particles of the CB is uniform, even when the average distance between adjacent wall surfaces is a certain value or less. In view of the foregoing, it may be effective to suppress the local concentration of an electric field in order to prevent a decrease in electric resistance caused by the carbonization of the resin between the particles of the CB. Based on such discussion, the inventors have repeatedly made investigations so as to obtain an intermediate transfer belt in which a change in conductivity over time is further suppressed. As a result, the inventors have found that an intermediate transfer member including a base layer, in which the base layer contains a thermoplastic resin and an electroconductive filler dispersed in the thermoplastic resin, the base layer has a volume resistivity of $1 \times 10^6$ $\Omega \cdot cm$ or more and $1 \times 10^{13}$ $\Omega \cdot cm$ or less, and the base layer has an electroconductive path index that can be determined by a specific method of 0.20 or less, is effective in achieving the above-mentioned object.

The electroconductive path index is increased when a high voltage is concentrated in a specific portion in an electroconductive path formed of carbon black, causing deterioration (carbonization) of a resin present between the particles of the carbon black, in an elastic layer. Meanwhile, when the formation state of the electroconductive path is more uniform, a high voltage is less liable to be concentrated in the specific portion, and hence the resin present between the particles of the carbon black is not deteriorated, with the result that the electroconductive path index calculated by the above-mentioned method is decreased. That is, when the electroconductive path index is smaller, the resin present between the particles of the carbon black is less liable to be deteriorated even after long-term use, with the result that the stability of conductivity over time becomes excellent. A method of determining an electroconductive path index is described below.

<Method of Evaluating Dispersibility (Method of Calculating Electroconductive Path Index)>

In an intermediate transfer member (electroconductive belt) to be measured, an electroconductive path index for identifying the dispersed state of an electroconductive filler in the following front surface region, the following back surface region, and the following central region is calculated by a method including the steps (1) to (6) described below.

Front surface region: A region ranging from a surface (outer peripheral surface) side on which a toner image is borne to 10 μm in a thickness direction Back surface region: A region ranging from an inner peripheral surface side opposite to the outer peripheral surface to 10 μm in the thickness direction Central region: A region ranging from a central portion in the thickness direction serving as a center to 5 μm in a direction of the outer peripheral surface side and to 5 μm in a direction of the inner peripheral surface side Step (1)

Figure 4:
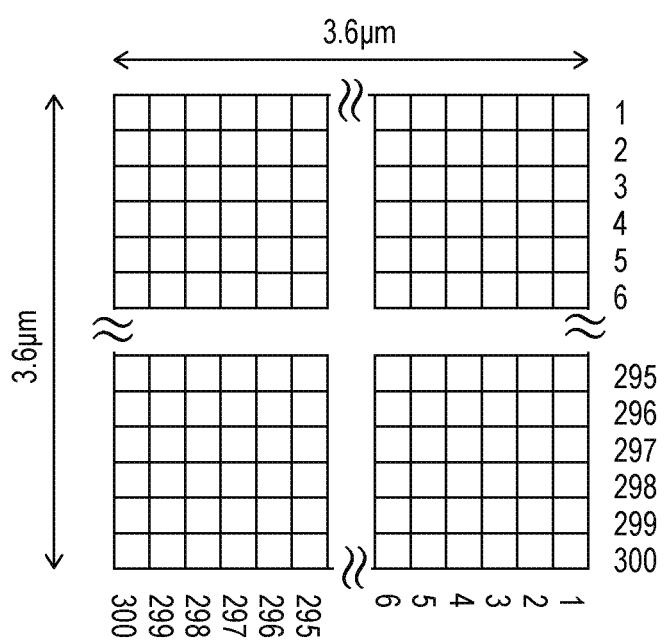
FIG. 4 is a schematic diagram for illustrating the vertical and horizontal lengths, and the number of pixels, of an image cut out from a SEM image.

First, the electroconductive belt is cut out into a square shape of about 10 mm×10 mm in a surface direction with a razor blade or the like, and is then embedded with an epoxy resin. After the epoxy resin has been cured, cross-sections are polished with abrasive paper to produce a cross-section sample in which all the cross-sections in a thickness direction of an elastic layer are exposed. A secondary electron image at a magnification of 20,000 times having a size of 3.6 μm in length and 3.6 μm in width, a resolution of 300 pixels×300 pixels, and 256 gradations from a lowest gradation of 0 to a highest gradation of 255 is acquired from any position of each of the front surface region, back surface region, and central region of the obtained cross-section sample through use of a scanning electron microscope (product name: XL-30 SFEG; manufactured by Philips Inc.). An example of the secondary electron image that can be obtained in the step (1) is illustrated in FIG. 4.

Each of the obtained secondary electron images is subjected to the following processing.

Step (2)

The pixels in the secondary electron image are subjected to adaptive thresholding in which a binarized threshold is defined as an average value, to thereby provide a first binarized image including a pixel group P1 corresponding to the electroconductive filler and a pixel group P2 corresponding to the thermoplastic resin.

Step (3)

A potential of each of the pixels is determined in the first binarized image through use of a difference method based on Kirchhoff's laws.

Step (4)

As to each of the first binarized images, assuming that pixels belonging to the pixel group P2 are defined as pixels P22, pixels belonging to the pixel group P1 are defined as pixels P11, and among pixels P22, a pixel or pixels which is adjacent to at least one of the pixels P11 is defined as pixels P22-1, determining a potential difference between the pixel P22-1 and the pixel(s) P11 adjacent to the pixel P22-1 based on the potentials determined in the step (3), and when the potential difference is more than 300 V, obtaining a second binarized image in which the pixel P22-1 whose potential difference between the pixel(s) P11 adjacent thereto is substituted with the pixel P11, and determining a potential of each of the pixels in the second binarized image through use of the difference method based on Kirchhoff's laws.

Step (5)

The step (4) is repeated until the pixels P22-1 each having the potential difference of more than 300 V are eliminated, to thereby determine a convergence potential of each of the pixels.

Step (6)

A combined resistance value A is determined based on the potentials determined in the step (3), a combined resistance value B is determined based on the convergence potentials determined in the step (5), and an electroconductive path index is determined by the following equation (1):

Electroconductive path index=(A−B)/A    (1).

In addition, in the intermediate transfer belt according to the present disclosure, the electroconductive path index calculated from each of the regions is 0.20 or less.

The electroconductive path index calculated by the above-mentioned method is increased when a high voltage is concentrated in a specific portion in an electroconductive path formed of carbon black, causing deterioration (carbonization) of a resin present between the particles of the carbon black, in an elastic layer. Meanwhile, when the formation state of the electroconductive path is more uniform, a high voltage is less liable to be concentrated in the specific portion, and hence the resin present between the particles of the carbon black is not deteriorated, with the result that the electroconductive path index calculated by the above-mentioned method is decreased. That is, when the electroconductive path index is smaller, the resin present between the particles of the carbon black is less liable to be deteriorated even after long-term use, with the result that the stability of conductivity over time becomes excellent.

A method of calculating an electroconductive path index based on the method including the above-mentioned steps (1) to (6) is described in detail below with reference to FIG. 6 to FIG. 9A and FIG. 9B.

Figure 6:
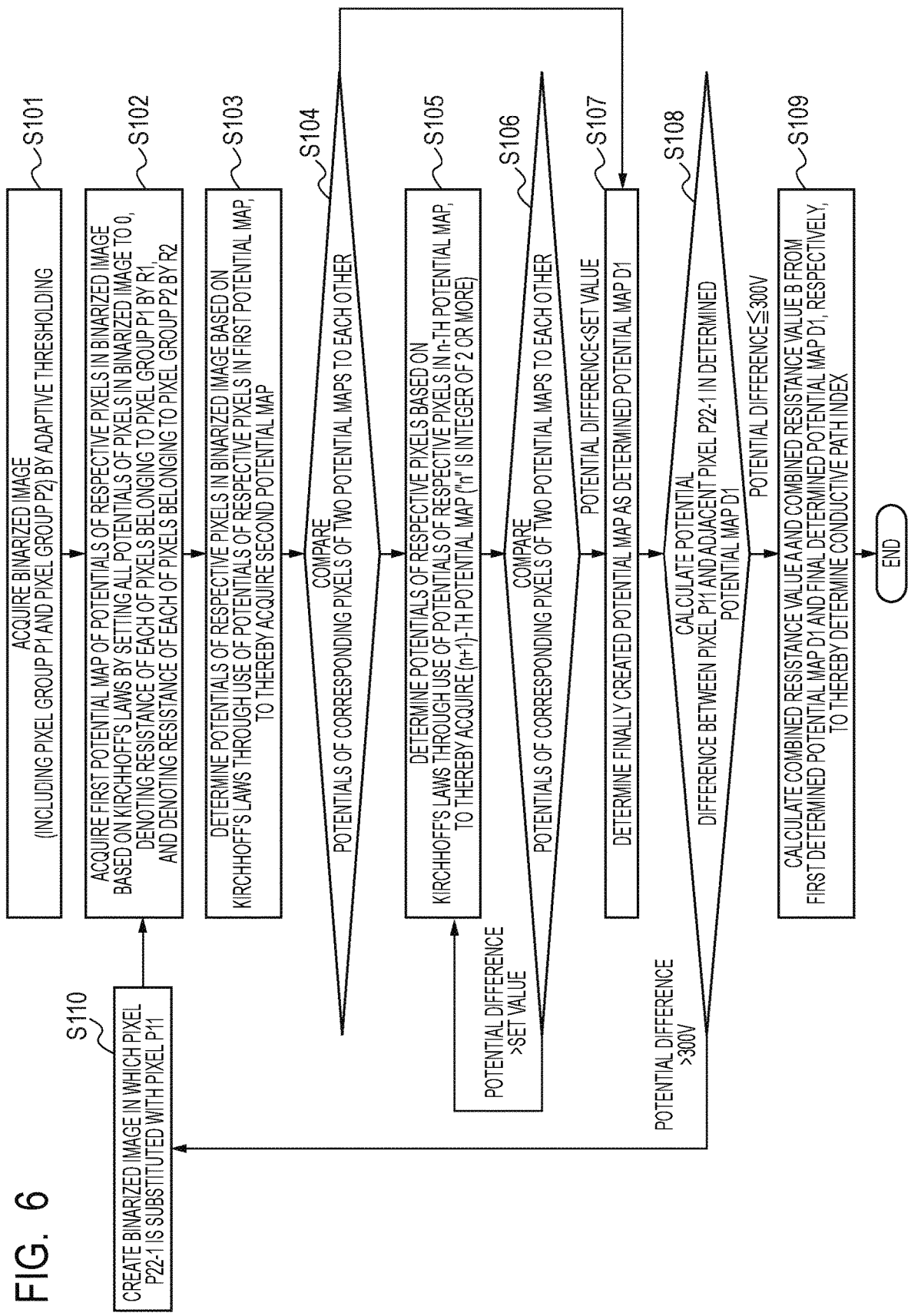
FIG. 6 is a flowchart for illustrating a method of calculating an electroconductive path index.

FIG. 6 is a flowchart of a method of calculating an electroconductive path index.

The step S101 is a process corresponding to the above-mentioned step (2). That is, the step S101 is a process of subjecting the pixels in the secondary electron image to adaptive thresholding with respect to each of the secondary electron images, to thereby form a binarized image including a pixel group P1 corresponding to an electroconductive filler and a pixel group P2 corresponding to a thermoplastic resin. The adaptive thresholding is processing of setting thresholds for each set region range to binarize the pixels, and the processing may reduce the influence of shadow and noise in an image. Specifically, when focus is given on a specific pixel in a secondary electron image, binarization is performed based on the gradation data of the specific pixel and each of four pixels adjacent to the specific pixel. FIG. 7A is a diagram for schematically illustrating an example of the obtained binarized image in which pixels 1, 3, 5, 7, and 9 are pixels corresponding to the thermoplastic resin, and pixels 2, 4, 6, and 8 are pixels corresponding to the electroconductive filler.

The step S102 is a process corresponding to the above-mentioned step (3). Here, a potential of each of the pixels is determined through use of a difference method based on Kirchhoff's laws with respect to the binarized image obtained in the step S101. Specifically, a first potential map is obtained based on Kirchhoff's laws by setting the potential of each of the pixels in the binarized image to 0 volts, denoting the resistance of each of the pixels belonging to the pixel group P1 by R1, and denoting the resistance of each of the pixels belonging to the pixel group P2 by R2.

Specifically, as illustrated in FIG. 7B, all the potentials of the pixels 1 to 9 are each set to 0 volts. In addition, the resistance value R1 of each of the pixels 1, 3, 5, 7, and 9 was determined to be a value obtained by dividing the volume resistivity of $3.0 \times 10^{-5}$ Ω·m of carbon black by the length of one pixel ($12 \times 10^{-9}$ m), that is, $2.5 \times 10^{3}$ Ω, and the resistance value R2 of each of the pixels 2, 4, 6, and 8 was determined to be a value obtained by dividing the volume resistivity of $1.0 \times 10^{18}$ Ω·m of PEEK by the length of one pixel, that is, $8.3 \times 10^{25}$ Ω. Then, the voltage value of each of the pixels is determined in accordance with Kirchhoff's laws by setting an upper end one side as an input voltage to 3,000 V and assuming a lower end one side as a grounded state to 0 V, to thereby provide a first potential map (FIG. 7C).

In the next step S103, a potential of each of the pixels in the binarized image is calculated based on Kirchhoff's laws through use of the potential of each of the pixels in the first potential map obtained in the step S102, to thereby provide a second potential map. Then, in the next step S104, the first potential map and the second potential map are compared to each other, to thereby compare the potentials of the respective corresponding pixels to each other.

As a result, when the potential difference between the corresponding pixels is more than a set value, the flow proceeds to a step S105, and a potential of each of the pixels in the binarized image is calculated based on Kirchhoff's laws through use of the potential of each of the pixels in the second potential map, to thereby create a third potential map. Then, in a step S106, the second potential map and the third potential map are compared to each other, to thereby compare the potentials of the respective corresponding pixels to each other. As a result, when the potential difference between the corresponding pixels is more than a set value, the flow returns to the step S105. Similarly, a fourth potential map is created, and the third potential map and the fourth potential map are compared to each other, to thereby compare the potentials of the respective corresponding pixels to each other. Thus, an n-th potential map ("n" is an integer of 2 or more) and an (n+1)-th potential map are compared to each other, to thereby compare the potentials of the respective corresponding pixels to each other, and the steps S105 and S106 are repeated until a potential difference is converged. Then, when the potential difference between the corresponding pixels of the n-th potential map ("n" is an integer of 2 or more) and the (n+1)-th potential map becomes less than a set value, a finally created potential map is determined to be a determined potential map D1 of the binarized image (step S107). In the step S104, when the potential difference between the corresponding pixels is equal to or less than a set value in comparison between the first potential map and the second potential map, the steps S105 and S106 are skipped, and the second potential map is determined to be a determined potential map in the step S107. An example of the determined potential map is illustrated in FIG. 7D. The value of a potential described in each of the pixels in the determined potential map illustrated in FIG. 7D is a fictitious value.

Here, in the determined potential map D1, the pixels belonging to the pixel group P2 are each denoted by P22, and the pixels belonging to the pixel group P1 are each denoted by P11. Then, as illustrated in FIG. 7E, the pixels adjacent to the pixels P11 in the pixels P22 are each denoted by P22-1. Then, a potential difference between the pixel P22-1 and the adjacent pixel P11 is calculated (step S108). Then, when the potential difference is more than 300 V, a binarized image in which the pixel P22-1 is substituted with the pixel P11 is newly created (step S110). In FIG. 8, there is illustrated a binarized image in which the pixel P22-1 having a potential that differs from the potential of the adjacent pixel P11 by more than 300 V is substituted with the pixel P11 with respect to each of the pixels in the determined potential map D1 illustrated in FIG. 7D. A pixel 5 in FIG. 8 is a pixel obtained by substituting the pixel P22 in the binarized image of FIG. 7A with the pixel P11.

Figure 9A:
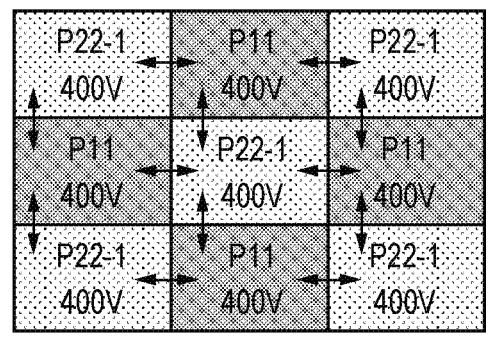
FIG. 9A is a diagram for illustrating an example of a determined potential map obtained finally through the step S108 of the flowchart of FIG. 6.
Figure 9B:
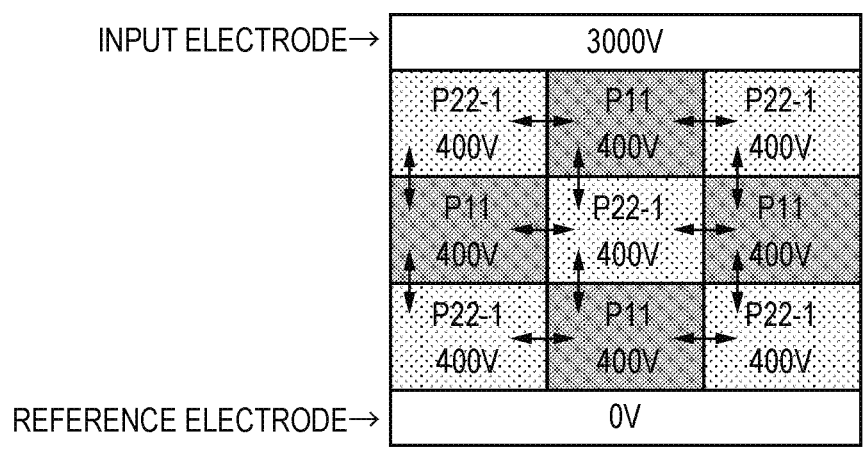
FIG. 9B is an explanatory diagram of a method of calculating a combined resistance from the determined potential map.

Then, the processes of the steps S102 to S108 are performed on the binarized image created in the step S110. Thus, the processes of the steps S102 to S108 are repeated until the potential difference between the pixel P22-1 and the adjacent pixel P11 becomes 300 V or less in the determined potential map. Then, a determined potential map in which the pixel P22-1 having a potential difference from the pixel P11 of more than 300 V is not present is obtained. In FIG. 9A, there is illustrated an example of a determined potential map in which the pixel P22-1 having a potential difference from the pixel P11 of more than 300 V is not present. The value of a potential described in each of the pixels of the determined potential map illustrated in FIG. 9A is also a fictitious value. Here, the threshold is set to 300 V, and this value is set as 10% of an input voltage (3,000 V). This threshold is set in consideration of the correlation with the experimental results obtained by subjecting intermediate transfer members 1 to 3 produced through use of various electroconductive fillers to a paper passing endurance test and comparing the resistivities before and after the paper passing endurance test to each other.

In the paper passing endurance test, a solid white image was output on 20,000 sheets of A3-size plain paper (product name: CS-068, manufactured by Canon Inc.) with an electrophotographic image forming apparatus (manufactured by Canon Inc., imageRUNNER ADVANCE DX C5870F). After the solid white image was output on 20,000 sheets, the result obtained by measuring the volume resistivity of each of the intermediate transfer members through use of the above-mentioned method was compared to the volume resistivity thereof before the paper passing endurance test, and a decrease amount of a common logarithm value of the volume resistivity was determined. The values of electroconductive path indices calculated by setting 5%, 10%, and 30% of the input voltage as thresholds and a change amount of resistivity of each of the intermediate transfer members before and after the paper passing endurance test are shown in Table 1.

A case in which a voltage (300 V) of 10% of the input voltage was set was most correlated with the change amount of resistivity in the endurance test, and hence a threshold of 10% was set.

In Table 1, the intermediate transfer member 1 corresponds to an intermediate transfer member according to Comparative Example 2 described below, the intermediate transfer member 2 corresponds to an intermediate transfer member according to Example 1 described below.

TABLE 1

| | Decrease amount of volume resistivity before and after endurance test | Threshold | Electroconductive path index |
|---|---|---|---|
| Intermediate transfer member 1 | 0.0 | 5% (150 V) | 1.0 |
| | | 10% (300 V) | 0.0 |
| | | 30% (900 V) | 0.0 |
| Intermediate transfer member 2 | 0.5 | 5% (150 V) | 2.0 |
| | | 10% (300 V) | 0.5 |
| | | 30% (900 V) | 0.0 |

Next, in a step S109, the combined resistance value B is calculated from a total of inflow currents at an input electrode based on the finally created determined potential map in which the pixel P22-1 having a potential difference from the pixel P11 of more than 300 V is not present. Specifically, a method of calculating a combined resistance value of pixels in contact with the input electrode involves calculating each of current values of three pixels in contact with the input electrode in the determined potential map illustrated in FIG. 9B. Then, the combined resistance value B is calculated from a sum of the current values of the respective pixels and the applied voltage (3,000 V).

In addition, the combined resistance value A is calculated in the same manner as in the foregoing based on the first created determined potential map obtained in the step S107.

Then, a change rate of a combined resistivity is determined by the following equation (1), and this value is used as an electroconductive path index in the present disclosure.

$$\text{Electroconductive path index} = (A-B)/A \qquad (1).$$

As described above, the electroconductive path index determined by the above-mentioned method has a larger value when the degree of a decrease in electric resistance value caused by the local concentration of an electric field is larger. Specifically, when the uniformity of an electroconductive path formed by an electroconductive filler is low, the uniformity of a distance between particles of the electroconductive filler is low, and the local concentration of an electric field occurs, with the result that an electric resistance value is decreased owing to carbonization of a resin between the particles of the electroconductive filler. Meanwhile, when the state of an electroconductive path formed by electroconductive particles is more uniform, the local concentration of an electric field is less liable to occur. In other words, an electric field is uniformly applied between the particles of the electroconductive filler, and hence carbonization of the resin between the particles of the electroconductive filler is less liable to occur. As a result, an intermediate transfer member in which conductivity is not easily changed even after long-term use can be obtained. The lower limit of the electroconductive path index is not particularly limited, but the electroconductive path index may be 0.00 or more.

In order to obtain an intermediate transfer member having an electroconductive path index of 0.20 or less, it is effective to sufficiently loosen the structure configuration of carbon black and distribute the loosened carbon black into a binder resin evenly to the extent possible in a process of melting and kneading the binder resin and an electroconductive filler at the time of the formation of a base layer. A specific device is described later.

An intermediate transfer member and an electrophotographic image forming apparatus according to the present disclosure are described in detail below.

<Intermediate Transfer Member>

An intermediate transfer belt 7 serving as an intermediate transfer member includes at least a base layer (base material), and may be a laminate formed of a plurality of layers further including a surface layer (front layer) and the like.

Figure 2A:
FIG. 2A and FIG. 2B are each a schematic view of a cross-section of the intermediate transfer member according to the present disclosure.
Figure 2B:
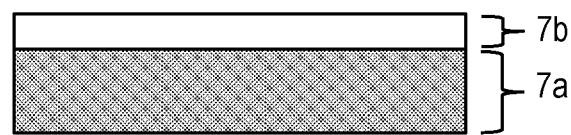

FIG. 2A and FIG. 2B are each a schematic sectional view for illustrating an example of a layer configuration of the intermediate transfer belt 7. As illustrated in FIG. 2A, the intermediate transfer belt 7 may be formed of a single layer (herein, the single layer may also be sometimes referred to as "base layer") 7a. In addition, as illustrated in FIG. 2B, the intermediate transfer belt 7 may be formed of at least two layers, that is, the base layer 7a and a surface layer 7b formed on the base layer 7a. For example, another layer such as an intermediate layer may be formed between the base layer 7a and the surface layer 7b. As described in detail below, the base layer 7a is a semiconductive film containing an electroconductive filler in a resin.

<Configuration and Characteristics of Intermediate Transfer Member>
<Resin Material>

As a resin material for the base layer of the intermediate transfer belt formed of a single layer or the intermediate transfer belt formed of at least two layers, the following thermoplastic resins may each be used: a polyphenylene sulfide resin (PPS resin), a polyetherimide resin (PEI resin), a polyetheretherketone resin (PEEK resin), a polyamide resin, and the like. In particular, polyetheretherketone (PEEK) is used because the intermediate transfer belt is required to have such performance that the intermediate transfer belt does not become loose even under a long-term tension load and does not wear on the surface by rubbing with a cleaning blade. In addition, two or more kinds of those resins may be selected and mixed for use as required.

<Electroconductive Filler>

At least one kind of electroconductive filler, such as carbon black or metal fine particles, is blended into the resin material for the purpose of, for example, imparting conductivity to the base layer. Of those, carbon black is used from the viewpoint that excellent mechanical and physical properties can be obtained. The carbon black has various designations depending on its production method and raw materials. Specifically, there are given Ketjen black, furnace black, acetylene black, thermal black, gas black, and the like.

As the carbon black, various known kinds of carbon black may each be used. Specific examples thereof include Ketjen black, furnace black, acetylene black, thermal black, and gas black. Of those, acetylene black and furnace black, which have few impurities, have a low frequency of foreign matter defects when molded into a film shape together with the above-mentioned thermoplastic resin, and easily provide desired conductivity, are used. Specific examples of the acetylene black include: "Denka Black" series (manufactured by Denka Company Limited); "Mitsubishi conductive filler" series (manufactured by Mitsubishi Chemical Corporation); "VULCAN" series (manufactured by Cabot Corporation); "Printex" series (manufactured by Degussa AG); and "SRF" (manufactured by Asahi Carbon Co., Ltd.). Specific examples of the furnace black include: "TOKABLACK" series (manufactured by Tokai Carbon Co., Ltd.); "Asahi Carbon Black" series (manufactured by Asahi Carbon Co., Ltd.); and "NITERON" series (manufactured by Nippon Steel Carbon Co., Ltd.).

<Content of Electroconductive Filler>

The content of the electroconductive filler to be added is selected in consideration of the ability to impart required conductivity to a belt member, the mechanical strength of the belt member, such as bending resistance or an elastic modulus, and the thermal conductivity thereof. When the content of the electroconductive filler is too large, the conductivity is excessively increased or the mechanical strength is excessively decreased. Thus, in one embodiment, the content of the electroconductive filler is 30.0 wt % or less. In another embodiment, the content of the electroconductive filler is 28.0 wt % or less.

Meanwhile, when the content of the electroconductive filler is too small, the electric conductivity of the belt member becomes too small, or it becomes difficult to satisfactorily keep the dispersed state of the electroconductive filler inside the intermediate transfer belt. Thus, in one embodiment, the content of the electroconductive filler is 15.0 wt % or more, and in another embodiment, 20.0 wt % or more.

<Volume Resistivity>

The intermediate transfer member according to the present disclosure has a volume resistivity of $1 \times 10^6$ Ω·cm or more and $1 \times 10^{13}$ Ω·cm or less at the time of application of a voltage of 10 V.

When the volume resistivity of the intermediate transfer member is less than $1 \times 10^6$ Ω·cm, there is an issue in that scattering of a toner image caused by pre-transfer occurs in a primary transfer portion and a secondary transfer portion. Meanwhile, when the volume resistivity of the intermediate transfer member is more than $1 \times 10^{13}$ Ω·cm, there is an issue in that the charge on the intermediate transfer member is not removed, and a memory image is generated.

When the volume resistivity at the time of application of a voltage of 10 V is $1 \times 10^6$ Ω·cm or more and $1 \times 10^{13}$ Ω·cm or less, image defects, such as scattering of toner and a memory image, do not occur.

<Method of Producing Intermediate Transfer Member>

The base layer of the intermediate transfer member formed of a single layer or the intermediate transfer member including at least two layers according to the present disclosure is produced through each of the following steps (1) and (2):

(1) a mixing step of mixing a resin material and an electroconductive filler under a temperature environment in which the temperature of the resin material is equal to or more than the glass transition point of the resin material, to thereby provide a mixture; and (2) a molding step of melting the mixture obtained in the second mixing step at a temperature equal to or more than the melting temperature of the resin material, to thereby mold the resultant into a cylindrical tube shape.

Each of the production steps (1) and (2) is described below.

<Mixing Step>

In the mixing step, the resin material and the electroconductive filler are melted and kneaded under a temperature environment that is equal to or more than the glass transition point of the resin material and that is equal to or less than the temperature at which the resin material is not thermally deteriorated, to thereby provide a polymer mixture.

Figure 3A:
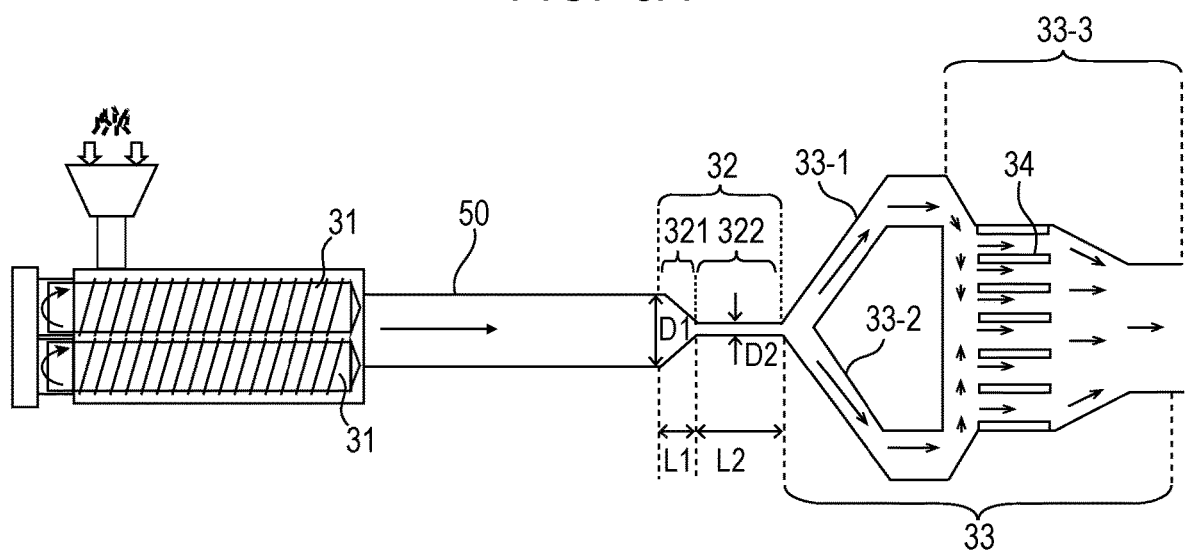
FIG. 3A is a schematic view of a production device for a polymer mixture according to one embodiment of the present disclosure.
Figure 3B:
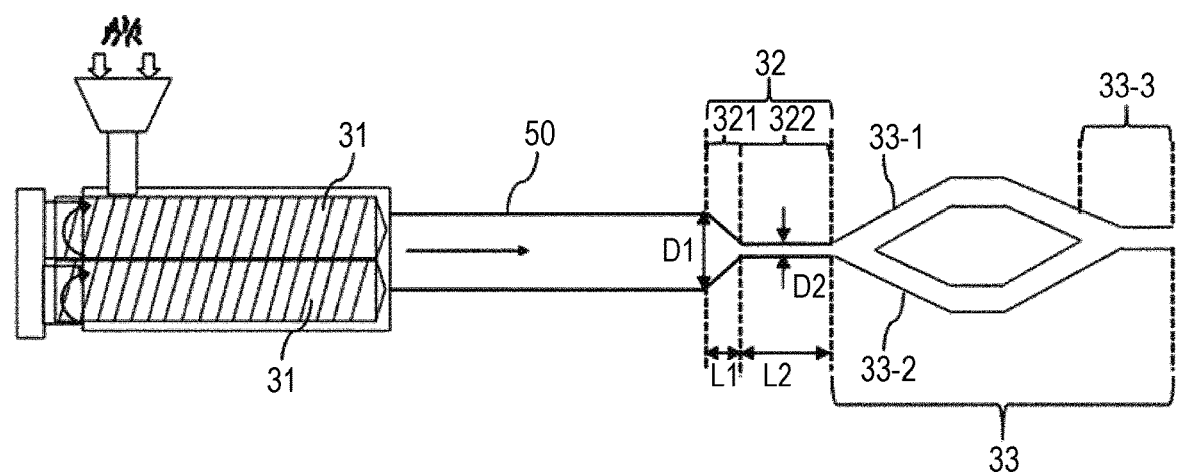
FIG. 3B is a schematic view of a production device for a polymer mixture according to another embodiment of the present disclosure.

As a mixing device to be used in the mixing step, a twin-screw kneader including two screws 31 in a barrel or a cylinder as illustrated in FIG. 3A and FIG. 3B may be used. The mixture supplied from a supply hole of a supply portion undergoes heat generation by shearing due to friction between the barrel or the cylinder, the screws, and the raw material while being fed toward a distal end (right-hand direction of FIG. 3A and FIG. 3B) in a flow path 50 by the rotation of the screws 31, and is melted and kneaded.

In the present disclosure, the polymer mixture is fed from the flow path 50 to a shear force applying portion 32, and is further fed to a distribution-accelerating flow path 33. The shear force applying portion 32 includes an introduction region 321 and a gap portion 322. As the polymer mixture advances from the flow path 50 through the gap portion 322 via the introduction region 321, an extensional shear force acts on the polymer mixture. In addition, as the polymer mixture passes through the gap portion 322, a shear force received from the inner wall surface of the gap portion 322 acts on the polymer mixture. As these two shear forces act on the polymer mixture, the structural structure of carbon black in the polymer mixture is torn off, and the dispersion of carbon black proceeds in the thermoplastic resin.

The gap portion 322 has a face-to-face distance (inner diameter) D2 of, for example, from 0.3 mm to 5 mm and a length L2 of, for example, from 1 mm to 500 mm. However, the distance D2 and length L2 of the gap portion 322 are not limited to the above-mentioned dimensions as long as the structure configuration of the carbon black in the polymer mixture can be sufficiently disintegrated. In addition, there is no particular limitation on a diameter (inner diameter) D1 of the flow path 50 as long as the diameter D1 is larger than the D2. In one embodiment, the diameter D1 is such a diameter that a sufficient shear force can be applied to the polymer mixture when the polymer mixture flowing through the flow path 50 passes through the shear force applying portion 32. Specifically, for example, from the viewpoints of the application of a sufficient shear force and the prevention of an increase in size of the device, in one embodiment, the diameter D1 is from 10 times to 20 times, particularly from 12 times to 16 times as long as the D2. That is, a ratio (D1/D2) of the inner diameter D1 to a face-to-face distance of the gap portion in the shear force applying portion is 10 to 20, and D1/D2 is 12 to 16. In addition, the introduction region 321 is provided so as to assist in smooth introduction of the polymer mixture from the flow path 50 to the gap portion 322. There is no particular limitation on a length L1 of the introduction region 321, but the length L1 is such a length that the diameter of the introduction region 321 is gradually reduced to be connected to the gap portion so that the polymer mixture is not retained when reaching the gap portion 322 from the flow path 50. In one embodiment, the length L1 is from 30 mm to 50 mm, or particularly from 35 mm to 45 mm.

The polymer mixture in a molten state having passed through the gap portion 32 is distributed to a plurality of flow paths 33-1 and 33-2. In order to prevent the carbon black having the structure configuration sufficiently disintegrated in the gap portion 322 from creating a structure configuration again, the flow of the polymer mixture having passed through the gap portion 322 is distributed to at least two flow paths. As a result, the disintegrated carbon black can be redistributed into the resin, and a more uniform electroconductive path can be formed. The number of distribution flow paths is set to two in FIG. 3A and FIG. 3B, but can also be set to three or more without being limited to two.

The flow of the polymer mixture divided into the distribution flow paths 33-1 and 33-2 may be joined in a rejoining flow path 33-3. After that, the polymer mixture is extruded into a bar shape from a strand die (not shown) attached to a distal end side. The bar-shaped extrudate is then cut to produce pellets. The pellets thus obtained are subjected to cylindrical extrusion molding to provide a cylindrical tube serving as the base layer of the intermediate transfer belt. In the pellets prepared by the above-mentioned method, the carbon black is dispersed significantly uniformly in the thermoplastic resin. Thus, the electroconductive path index in the cylindrical tube produced through use of the pellets is 0.2 or less.

The mixing device illustrated in FIG. 3A includes, in the rejoining flow path 33-3, flow path dividing members 34 that divide the flow of the polymer mixture in the rejoining flow path 33-3 to the distal end side into a plurality of parts. However, the flow path dividing members 34 are not essential in the mixing device according to the present disclosure, and as in the mixing device illustrated in FIG. 3B, it is sufficient that the rejoining flow path 33-3 in which the polymer mixture having flowed through the plurality of flow paths 33-1 to 33-2 connected to the shear force applying portion 32 is joined be provided.

A mixing step of mixing the thermoplastic resin and the electroconductive filler with a fluidizing mixer under a temperature environment that is less than the glass transition point of the thermoplastic resin may be provided before the mixing step of mixing the thermoplastic resin and the electroconductive filler under a temperature environment that is equal to or more than the glass transition point of the thermoplastic resin. As the fluidizing mixer, various known mixers each having a mechanism of mixing through use of the flow motion of a solid may each be used. Specifically, a mixer, such as a Henschel mixer, a ribbon mixer, or a planetary mixer, may be used. Of those, a Henschel mixer is used from the viewpoint of its excellent mixing efficiency. In addition, it is required to appropriately select the rotation speed, treatment time, treatment amount, and the like of the fluidizing mixer depending on the material.

<Molding Step>

In the molding step, the pellets of the mixture obtained in the mixing step are used to mold into a belt shape of a cylindrical tube shape. In molding, a method, such as an extrusion molding method or an inflation molding method, may be selected depending on the resin to be used, but it is to use a cylindrical extrusion molding method from the viewpoint of its excellent productivity.

When the cylindrical extrusion molding method is used, in one embodiment, it is to use a uniaxial extruder having a single screw in a barrel or cylinder as the extruder used. When the cylindrical tube shape is extruded, the pelleted mixture is extruded in a plasticized state, and it is to apply as little shear force as possible so that the electroconductive filler in the mixture does not reaggregate. In a uniaxial extruder, it is possible to extrude while maintaining the dispersion state of the electroconductive filler in the mixture. In the extrusion process, the pellet-shaped mixture is supplied from the supply hole of the supply portion. The supplied pellet-shaped mixture receives thermal energy from the barrel or the cylinder and mechanical energy from the screw while advancing toward the die by the rotation of the screw, and is substantially completely melted. Then, the resultant is quantitatively supplied to the distal end portion of the extruder. A cylindrical die is installed in the distal end portion of the extruder, and the mixture is molded into a cylindrical tube shape by extruding the mixture downward from the cylindrical die and taking the mixture from below.

Although not limited to the following, in one embodiment, the thickness of the base layer of the intermediate transfer member formed of a single layer or the intermediate transfer member formed of at least two layers is usually from 10 μm to 500 μm, typically from 50 μm to 200 μm.

<Average Particle Diameter of Primary Particles of Electroconductive Filler>

In one embodiment, the number average particle diameter of primary particles of the electroconductive filler to be added is 10 nm or more and 30 nm or less. When the electroconductive filler having a number average particle diameter of primary particles of 10 nm or more is used, reaggregation of the electroconductive filler is less liable to occur. In addition, when the number average particle diameter of primary particles is equal to or less than 30 nm, aggregated clots are less liable to be generated. Thus, an intermediate transfer member having a electroconductive path index of 0.2 or less can be more easily produced.

<Method of Evaluating Average Particle Diameter of Primary Particles of Electroconductive Filler incorporated into Base Layer>

Observation of carbon black incorporated into the resin composition is performed with a transmission electron microscope (TEM), but preparation of a thinned sample before observation is performed by a known method. For example, a sample may be thinned with an ion beam, a diamond knife, or the like. In the following Examples, cutting is performed with "ULTRACUT-S" manufactured by Leica Microsystems, and a cutting piece sample for observation having a thickness of about 40 nm is collected. Then, a TEM image is acquired through use of a transmission electron microscope (TEM) (product name: H-7100FA, manufactured by Hitachi, Ltd.) under measurement conditions of a TE mode and an acceleration voltage of 100 kV. For the analysis of the acquired TEM image, known image analysis software may be used. Examples thereof include "WinROOF" (product name, manufactured by Mitani Corporation) and "ImagePro" (product name, manufactured by Nippon Roper K. K.). In the following Examples, "WinROOF" was used. Then, the diameters of 50 primary particles of the electroconductive filler are measured, and the arithmetic average value thereof is defined as the average particle diameter (number average particle diameter) of the primary particles.

<Dispersibility>

The dispersibility is evaluated by an electroconductive path index described later. In order to sufficiently suppress discharge by suppressing the local concentration of an electric field, the electroconductive path index is 0.20 or less, or 0.10 or less.

<Method of Measuring Volume Resistivity>

The volume resistivity was measured by connecting the following ring-shaped probe and the following measurement stage to the following resistivity meter and applying a voltage of 10 V between an electrode (main electrode) on an inner side of the probe and the measurement stage while applying a pressure of a weight of about 2 kg to a sample sandwiched between the probe and the measurement stage.

Resistivity meter (product name: Hiresta-UP, manufactured by Nittoseiko Analytech Co., Ltd.)

Ring-shaped probe (product name: URS probe, manufactured by Nittoseiko Analytech Co., Ltd., outer diameter of an electrode on an inner side: 5.9 mm, inner diameter of an electrode on an outer side: 11.0 mm, outer diameter of the electrode on the outer side: 17.8 mm)

Measurement stage (product name: Register table UFL, manufactured by Nittoseiko Analytech Co., Ltd.)

1. Image Forming Apparatus

First, an image forming apparatus using an intermediate transfer member (intermediate transfer belt) according to one embodiment of the present disclosure is described.

FIG. 1 is a schematic sectional view of an image forming apparatus 100 according to this embodiment. The image forming apparatus 100 according to this embodiment is a tandem-type color laser printer adopting an intermediate transfer system, which is capable of forming a full-color image through use of an electrophotographic system.

The image forming apparatus 100 includes first, second, third, and fourth image forming portions Py, Pm, Pc, and Pk as a plurality of image forming portions. The first, second, third, and fourth image forming portions Py, Pm, Pc, and Pk are arranged in the stated order along the moving direction of a flat portion (image transfer surface) of the intermediate transfer belt 7 described later. The first, second, third, and fourth image forming portions Py, Pm, Pc, and Pk include elements having the same or corresponding functions or configurations. Those elements are sometimes collectively described by omitting suffixes Y or "y", M or "m", C or "c", and K or "k" of reference symbols, which indicate that the elements are those for any colors. In this embodiment, the image forming portion P includes a photosensitive drum 1, a charging roller 2, an exposure device 3, a developing device 4, and a primary transfer roller 5 described later.

The image forming portion P includes the photosensitive drum 1 that is a drum-type (cylindrical) photosensitive member (electrophotographic photosensitive member) serving as an image bearing member. The photosensitive drum 1 is formed by laminating a charge generating layer, a charge transporting layer, and a surface protective layer in the stated order on a cylinder made of aluminum serving as a substrate. The photosensitive drum 1 is driven to rotate in a direction of the arrow (counterclockwise direction) in the figure.

The charging roller 2 is a roller-shaped charging member serving as a charging unit. The surface of the rotating photosensitive drum 1 is uniformly charged to a predetermined potential having predetermined polarity (negative polarity in this embodiment) by the charging roller 2. During a charging step, a predetermined charging bias (charging voltage) containing a DC component having a negative polarity is applied to the charging roller 2. The surface of the charged photosensitive drum 1 is scanned and exposed by the exposure device (laser scanner) 3 serving as an exposure unit in accordance with image information, and an electrostatic image (electrostatic latent image) is formed on the photosensitive drum 1.

The electrostatic image formed on the photosensitive drum 1 is developed (visualized) with toner serving as a developer supplied by the developing device 4 serving as a developing unit, and a toner image (developer image) is formed on the photosensitive drum 1. During a developing step, a predetermined developing bias (developing voltage) containing a DC component having negative polarity is applied to a developing roller 4a serving as a developer carrying member provided in the developing device 4. In this embodiment, toner charged to the same polarity (negative polarity in this embodiment) as the charging polarity of the photosensitive drum 1 adheres to an exposure portion (image portion) on the photosensitive drum 1 having an absolute value of a potential decreased through exposure after being uniformly charged.

The intermediate transfer belt 7 formed of an endless belt serving as an intermediate transfer member is arranged so as to face the four photosensitive drums 1. The intermediate transfer belt 7 is tensioned under predetermined tension over a drive roller 71, a tension roller 72, and a secondary transfer opposing roller 73 serving as a plurality of tensioning rollers. When the drive roller 71 is driven to rotate, the intermediate transfer belt 7 is brought into contact with the photosensitive drum 1 to be rotated (moved around) in a direction of the arrow R2 (clockwise direction) in the figure. On an inner peripheral surface side of the intermediate transfer belt 7, a primary transfer roller 5 that is a roller-shaped primary transfer member serving as a primary transfer unit is arranged so as to correspond to each of the photosensitive drums 1. The primary transfer roller 5 is pressed against the photosensitive drum 1 through intermediation of the intermediate transfer belt 7 to form a primary transfer portion (primary transfer nip) T1 in which the photosensitive drum 1 and the intermediate transfer belt 7 are brought into contact with each other. A toner image formed on the photosensitive drum 1 as described above is primarily transferred onto the rotating intermediate transfer belt 7 through the action of the primary transfer roller 5 in the primary transfer portion T1. During a primary transfer step, a primary transfer bias (primary transfer voltage) that is a DC voltage having polarity (positive polarity in this embodiment) opposite to the normal charging polarity of the toner (charging polarity during the developing step) is applied to the primary transfer roller 5.

The primary transfer roller 5 is a metal roller not covered with a semiconductive rubber. A material thereof is sulfur and sulfur composite free-cutting steel (SUM), stainless steel (SUS), or the like.

On an outer peripheral surface side of the intermediate transfer belt 7, a secondary transfer roller 8 that is a roller-shaped secondary transfer member serving as a secondary transfer unit is arranged at a position facing the secondary transfer opposing roller 73. The secondary transfer roller 8 is pressed against the secondary transfer opposing roller 73 through intermediation of the intermediate transfer belt 7 to form a secondary transfer portion (secondary transfer nip) T2 in which the intermediate transfer belt 7 and the secondary transfer roller 8 are brought into contact with each other. The toner image formed on the intermediate transfer belt 7 as described above is secondarily transferred onto a recording material (sheet, transfer material) S, such as paper (sheet of paper), conveyed while being sandwiched between the intermediate transfer belt 7 and the secondary transfer roller 8 through the action of the secondary transfer roller 8 in the secondary transfer portion T2. During a secondary transfer step, a secondary transfer bias (secondary transfer voltage) that is a DC voltage having polarity opposite to the normal charging polarity of the toner is applied to the secondary transfer roller 8. In the secondary transfer, a transfer voltage of several kilovolts is usually applied in order to secure sufficient transfer efficiency. The recording material S is supplied to a conveyance path by a pickup roller 13 from a cassette 12 in which the recording material S is stored. The recording material S supplied to the conveyance path is conveyed to the secondary transfer portion T2 by a conveyance roller pair 14 and a registration roller pair 15 in synchronization with the toner image on the intermediate transfer belt 7.

The recording material S having the toner image transferred thereon is conveyed to a fixing device 9 serving as a fixing unit. The fixing device 9 heats and pressurizes the recording material S bearing the unfixed toner image to fix (melt or firmly fix) the toner image onto the recording material S. The recording material S having the toner image fixed thereon is delivered (discharged) to the outside of a main body of the image forming apparatus 100 by a conveyance roller pair 16, a delivery roller pair 17, and the like.

The toner (primary transfer residual toner) remaining on the surface of the photosensitive drum 1 without being transferred onto the intermediate transfer belt 7 during the primary transfer step is collected simultaneously with the development by the developing device 4 also serving as a photosensitive member cleaning unit. In addition, the toner (secondary transfer residual toner) remaining on the surface of the intermediate transfer belt 7 without being transferred onto the recording material S during the secondary transfer step is removed from the surface of the intermediate transfer belt 7 by a belt cleaning device 11 serving as an intermediate transfer member cleaning unit and collected. The belt cleaning device 11 is arranged on a downstream side of the secondary transfer portion T2 and on an upstream side of the most upstream primary transfer portion T1y in a rotating direction of the intermediate transfer belt 7 (at a position facing the drive roller 71 in this embodiment). The belt cleaning device 11 scrapes the secondary transfer residual toner from the surface of the rotating intermediate transfer belt 7 with a cleaning blade serving as a cleaning member arranged so as to be brought into abutment against the surface of the intermediate transfer belt 7 and accommodates the toner in a collection container.

As described above, in the image forming operation, the electrical transfer process of the toner image from the photosensitive drum 1 to the intermediate transfer belt 7 and from the intermediate transfer belt 7 to the recording material S is repeated. In addition, when image formation on the large number of recording materials S is repeated, the electrical transfer process is further repeated.

According to one embodiment of the present disclosure, the intermediate transfer member capable of stabilizing electrical characteristics over long-term use and suppressing the occurrence of a blank dot image can be provided. In addition, according to another embodiment of the present disclosure, the image forming apparatus capable of stably forming a high-quality electrophotographic image can be provided. Further, according to at least one embodiment of the present disclosure, the production device for a polymer mixture excellent in dispersibility of electroconductive particles can be obtained.

EXAMPLES

Example 1

An intermediate transfer belt was produced through use of carbon black (brand name: #44; manufactured by Mitsubishi Chemical Corporation, number average particle diameter of primary particles: 24 nm) as an electroconductive filler and polyetheretherketone (product name: VICTREX 450G; manufactured by Victrex plc, glass transition temperature: 145° C., melting point: 335° C.) as a thermoplastic resin. The details of the blending amount of each of the materials and a mixing step are as described below.

<Blending Amount>
Carbon black: 28 parts by mass
PEEK: 72 parts by mass

<Mixing Step>
PEEK and carbon black were mixed at a temperature of 370° C. to provide a polymer mixture. As a mixing device, the twin-screw kneader including the two screws 31 in a barrel illustrated in FIG. 3A was used.

In addition, the shear force applying portion 32 including the gap portion 322 having the face-to-face distance D2 and causing the dispersion to proceed was installed in a flow path beyond a screw distal end portion of the twin-screw kneader. The flow path of the shear force applying portion 32 is formed so that a resin flows from the introduction region 321 into the gap portion 322. The inner diameter and length of each of the portions are as described below.

Maximum inner diameter D1 of flow path 50: 30 mm
Length L1 of introduction region 321 of shear force applying portion 32: 30 mm
Inner diameter D2 of gap portion 322: 2 mm
Length L2 of gap portion 322: 40 mm A strand die (not shown) was arranged on a distal end side of the rejoining flow path 33-3, and the polymer mixture was extruded into a bar shape. Then, the bar-shaped extrudate was air-cooled. After that, the resultant was cut into a pellet shape to provide pellets of the polymer mixture containing PEEK and carbon black dispersed in the PEEK.

<Molding Step>
An intermediate transfer belt having an endless shape according to this embodiment was obtained by extruding the pellet of the obtained polymer mixture into a tube shape using a single-screw extrusion molding machine with a spiral cylindrical die attached to the tip part under the following conditions and molding the resin tube. The extrusion molding conditions and the size of the intermediate transfer belt are as described below.

Dice temperature: 380° C.
Extrusion amount: 6 kg/hour
Outer diameter of intermediate transfer belt: 280 mm
Thickness of intermediate transfer belt: 62 µm The electroconductive path index of the obtained intermediate transfer belt, the volume resistivities thereof before and after the paper passing endurance test, and results of evaluation of a blank dot image thereof are shown in Table 3.

Example 2

Carbon black (brand name: #52; manufactured by Mitsubishi Chemical Corporation, number average particle diameter of primary particles: 27 nm) was used as an electroconductive filler. In addition, the blending amount of the carbon black and the blending amount of the resin material were changed as described below. An intermediate transfer belt was produced by the same method as that of Example 1 except for the foregoing.
<Blending Amount>
Carbon black: 24 parts by mass
PEEK: 76 parts by mass Comparative Example 1

Figure 5:
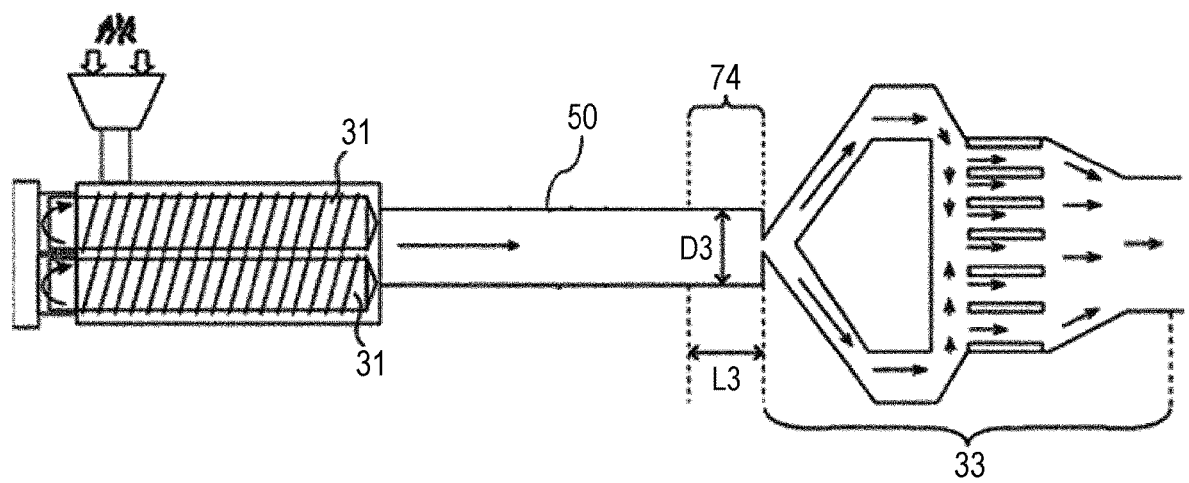
FIG. 5 is a schematic view of a production device for a polymer mixture used in Comparative Example 1.

An intermediate transfer belt was produced in the same manner as in Example 1 except that the mixing device used in the mixing step was changed to a mixing device illustrated in FIG. 5 in which an inner diameter D3 of the flow path 50 was set to 30 mm, and the flow path 50, and the distribution flow paths 33-1 and 33-2 were coupled to each other through a flow path 74 having a straight shape with an inner diameter of 30 mm.

Comparative Example 2

An intermediate transfer belt was produced by the same method as that of Example 1 except that the mixing device used in the mixing step was changed to a mixing device that did not include the distribution-accelerating flow path 33 of the mixing device illustrated in FIG. 3A.

The blending amount of the thermoplastic resin used in each of Examples 1 and 2, and Comparative Examples 1 and 2, the blending amount of the carbon black used therein, the presence or absence of the shear force applying portion, the presence or absence of the distribution-accelerating flow path, and the like are shown in Table 2.

The intermediate transfer belts according to Examples 1 and 2, and Comparative Examples 1 and 2 were subjected to the following evaluations 1 to 4. The results are shown in Table 3.

[Evaluation 1]

Results obtained by calculating an electroconductive path index from a cross-section image of each of the intermediate transfer belts according to Examples 1 and 2, and Comparative Examples 1 and 2 are shown in Table 3.

[Evaluation 2]

Results obtained by measuring a volume resistivity of each of the intermediate transfer belts according to Examples 1 and 2, and Comparative Examples 1 and 2 through use of the above-mentioned method are shown in Table 3.

[Evaluation 3]

Each of the intermediate transfer belts according to Examples 1 and 2, and Comparative Examples 1 and 2 was mounted as an intermediate transfer belt of the electrophotographic image forming apparatus (product name: imageRUNNER ADVANCE DX C5870F, manufactured by Canon Inc.) illustrated in FIG. 1. Through use of the electrophotographic image forming apparatus, an image having a total image duty of 3% was output on 600,000 sheets of A3-size plain paper (product name: CS-068, manufactured by Canon Inc.) in a low humidity environment (having a temperature of 23° C. and a relative humidity of 5%). Results obtained by measuring a volume resistivity of the intermediate transfer belt through use of the above-mentioned method after outputting the image on 600,000 sheets are shown in Table 3.

[Evaluation 4]

In the process of outputting the image on 600,000 sheets, every time the image was output on 10,000 sheets, a black entire halftone image (image X) was continuously output on five sheets only in the image forming portion Pk. The five sheets of the image X were visually observed and evaluated based on the following criteria.

Rank A: No blank dots were observed in any of the five sheets of the entire halftone image.

Rank B: A blank dot image including one or less blank dot per sheet was observed in one or two of the five sheets of the entire halftone image.

Rank C: Regarding the image X, a blank dot image including one or less blank dot per sheet was observed in three or more of the five sheets of the entire halftone image, or a plurality (two or more) of blank dots were observed in any one of the sheets.

TABLE 2

| | Carbon black | | Thermoplastic resin | | Presence or absence of shear force applying portion in mixing device | Presence or absence of distribution-accelerating flow path in mixing device |
|---|---|---|---|---|---|---|
| | Primary particle diameter (nm) | Blending amount (part(s) by mass) | Kind of material | Blending amount (part(s) by mass) | | |
| Example 1 | 24 | 28 | PEEK | 72 | Present | Present |
| Example 2 | 27 | 24 | PEEK | 76 | Present | Present |
| Comparative Example 1 | 24 | 28 | PEEK | 72 | Absent | Present |
| Comparative Example 2 | 24 | 28 | PEEK | 72 | Present | Absent |

TABLE 3

| | Evaluation 1 Electroconductive path index | Evaluation 2 Volume resistivity ($\Omega \cdot cm$) | | Evaluation 4 Blank dot image evaluation rank |
| --- | --- | --- | --- | --- |
| | | Initial stage | Evaluation 3 After paper passing endurance test | |
| Example 1 | 0.01 | $1 \times 10^{10}$ | $1 \times 10^{10}$ | A |
| Example 2 | 0.20 | $1 \times 10^{10}$ | $6 \times 10^{9}$ | A |
| Comparative Example 1 | 0.50 | $1 \times 10^{10}$ | $1 \times 10^{8}$ | B |
| Comparative Example 2 | 0.50 | $1 \times 10^{10}$ | $1 \times 10^{8}$ | B |

In each of Comparative Examples 1 and 2 in which a decrease in volume resistivity and a blank dot image were observed, the electroconductive path index was more than 0.2. It is conceived that the decrease in volume resistivity and the blank dot image were each caused by the fact that the satisfactory dispersed and distributed state of the carbon black could not be achieved in the resin. In this case, it is conceived that a blank dot image was generated owing to the discharge that occurred in a gap between the inner peripheral surface side of the intermediate transfer member and the primary transfer roller in the primary transfer portion or between the outer peripheral surface of the intermediate transfer member and the paper in the secondary transfer portion.

In Example 1, the electroconductive path index was 0.01, and hence it is conceived that the dispersed and distributed state of the carbon black was significantly satisfactory in the resin. There was no change in resistance value after the paper passing endurance test, and a blank dot image was not generated.

In Example 2, the electroconductive path index was 0.2, and hence it is conceived that the dispersed and distributed state of the carbon black was satisfactory in the resin. There was a small change in resistance value after the paper passing endurance test, and a blank dot image was not generated.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-144479, filed Sep. 12, 2022, Japanese Patent Application No. 2022-161984, filed Oct. 6, 2022, and Japanese Patent Application No. 2023-135288, filed Aug. 23, 2023, which are hereby incorporated by reference herein in their entirety.

What is claimed is:

1. An intermediate transfer member comprising a base layer,
   the base layer containing a thermoplastic resin and an electroconductive filler dispersed in the thermoplastic resin,
   the base layer having a volume resistivity of $1 \times 10^{6}$ to $1 \times 10^{13}$ $\Omega \cdot cm$, and having an electroconductive path index of 0.20 or less.

2. The intermediate transfer member according to claim 1, wherein the electroconductive filler is carbon black.

3. The intermediate transfer member according to claim 1, wherein the carbon black has an average particle diameter of primary particles of 30 nm or less.

4. The intermediate transfer member according to claim 1, wherein the thermoplastic resin contains at least one kind of resin selected from the group consisting of: polyetheretherketone; polyphenylene sulfide; polyamide; and polyetherimide.

5. The intermediate transfer member according to claim 1, wherein the thermoplastic resin is polyetheretherketone.

6. The intermediate transfer member according to claim 1, wherein the base layer has a thickness of from 10 μm to 500 μm.

7. An image forming apparatus comprising:
   a first image bearing member;
   an intermediate transfer member onto which an unfixed toner image formed on the first image bearing member is primarily transferred; and
   a secondary transfer unit configured to secondarily transfer the toner image primarily transferred onto the intermediate transfer member onto a second image bearing member,
   wherein the intermediate transfer member has a base layer,
   the base layer contains a thermoplastic resin and an electroconductive filler dispersed in the thermoplastic resin, and
   the base layer has a volume resistivity of $1 \times 10^{6}$ to $1 \times 10^{13}$ $\Omega \cdot cm$, and has an electroconductive path index of 0.20 or less.

8. The image forming apparatus according to claim 7, wherein the electroconductive filler is carbon black.

9. The image forming apparatus according to claim 8, wherein the carbon black has a number average particle diameter of primary particles of 30 nm or less.

10. The image forming apparatus according to claim 7, wherein the thermoplastic resin contains at least one kind of resin selected from the group consisting of:
    polyetheretherketone; polyphenylene sulfide; polyamide; and polyetherimide.

11. The image forming apparatus according to claim 10, wherein the thermoplastic resin is polyetheretherketone.

12. The image forming apparatus according to claim 7, wherein the base layer has a thickness of from 10 μm to 500 μm.

* * * * *